(12) United States Patent
Sinclair et al.

(10) Patent No.: US 12,448,498 B2
(45) Date of Patent: Oct. 21, 2025

(54) HYDROGEL COMPOSITIONS BASED ON POLYSACCHARIDES AND ZWITTERIONIC POLYMERS, AND METHODS FOR THEIR USE

(71) Applicant: Taproot Medical Technologies, LLC, Seattle, WA (US)

(72) Inventors: Andrew William Sinclair, Seattle, WA (US); Timothy James Fujihara, Seattle, WA (US)

(73) Assignee: Taproot Medical Technologies, LLC, Bothell, WA (US)

( * ) Notice: Subject to any disclaimer, the term of this patent is extended or adjusted under 35 U.S.C. 154(b) by 665 days.

(21) Appl. No.: 17/344,106

(22) Filed: Jun. 10, 2021

(65) Prior Publication Data

US 2021/0301108 A1    Sep. 30, 2021

Related U.S. Application Data

(63) Continuation of application No. PCT/US2019/065630, filed on Dec. 11, 2019.

(Continued)

(51) Int. Cl.
*C08L 5/08* (2006.01)
*A61K 8/04* (2006.01)
(Continued)

(52) U.S. Cl.
CPC .............. *C08L 5/08* (2013.01); *A61K 8/042* (2013.01); *A61K 8/735* (2013.01); *A61K 9/06* (2013.01);
(Continued)

(58) Field of Classification Search
CPC ........... C08L 5/08; A61K 8/042; A61K 8/735; A61K 9/06; A61K 47/36; A61L 27/20;
(Continued)

(56) References Cited

U.S. PATENT DOCUMENTS

2008/0287633 A1   11/2008   Drumheller
2014/0329915 A1*  11/2014   Nguyen ................ A61K 47/36
                                                              514/774
(Continued)

FOREIGN PATENT DOCUMENTS

CN    105126163 A    12/2015
CN    106243410 A    12/2016
(Continued)

OTHER PUBLICATIONS

Ye, Lei, et al. "Physical cross-linking starch-based zwitterionic hydrogel exhibiting excellent biocompatibility, protein resistance, and biodegradability." ACS applied materials & interfaces 8.24 (2016): 15710-15723. (Year: 2016).*

(Continued)

*Primary Examiner* — Isaac Shomer
(74) *Attorney, Agent, or Firm* — FORTEM IP LLP

(57) ABSTRACT

Disclosed are hydrogel compositions comprising both polysaccharide-based and polyzwitterionic components, methods of making the compositions, and methods of using the compositions for various clinical and biomedical applications.

31 Claims, 7 Drawing Sheets

Related U.S. Application Data

(60) Provisional application No. 62/782,213, filed on Dec. 19, 2018.

(51) Int. Cl.

| | | |
|---|---|---|
| *A61K 8/73* | (2006.01) | |
| *A61K 9/06* | (2006.01) | |
| *A61K 47/36* | (2006.01) | |
| *A61L 27/20* | (2006.01) | |
| *A61L 27/52* | (2006.01) | |
| *C08J 3/075* | (2006.01) | |
| *C12N 5/00* | (2006.01) | |

(52) U.S. Cl.
CPC .............. *A61K 47/36* (2013.01); *A61L 27/20* (2013.01); *A61L 27/52* (2013.01); *C08J 3/075* (2013.01); *C12N 5/0068* (2013.01); *A61L 2430/34* (2013.01); *C08J 2305/08* (2013.01); *C12N 2533/80* (2013.01)

(58) Field of Classification Search
CPC ...... A61L 27/52; A61L 2430/34; C08J 3/075; C08J 2305/08; C12N 5/0068; C12N 2533/80
See application file for complete search history.

(56) References Cited

U.S. PATENT DOCUMENTS

| | | | | |
|---|---|---|---|---|
| 2016/0251470 A1* | 9/2016 | Cheng | ................... | C08F 290/10 536/51 |
| 2017/0266350 A1* | 9/2017 | Jiang | .................... | A61K 9/0024 |
| 2018/0236135 A1 | 8/2018 | Cao et al. | | |
| 2020/0253192 A1 | 8/2020 | Jiang et al. | | |

FOREIGN PATENT DOCUMENTS

| | | | | | |
|---|---|---|---|---|---|
| CN | 107653575 | A | * | 2/2018 | ........... C12N 5/0693 |
| CN | 108473632 | A | | 8/2018 | |
| CN | 108676178 | A | | 10/2018 | |
| JP | 2003301001 | A | | 10/2003 | |
| JP | 2005298644 | A | | 10/2005 | |
| JP | 2009114073 | A | | 5/2009 | |
| WO | WO-2017091150 | A1 | | 6/2017 | |
| WO | WO-2018017879 | A1 | | 1/2018 | |
| WO | WO-2020131513 | A1 | | 6/2020 | |

OTHER PUBLICATIONS

Pescosolido, Laura, et al. "Hyaluronic acid and dextran-based semi-IPN hydrogels as biomaterials for bioprinting." Biomacromolecules 12.5 (2011): 1831-1838 (Year: 2011).*
Ma, Guanglong, et al. "Development of ionic strength/pH/enzyme triple-responsive zwitterionic hydrogel of the mixed I-glutamic acid and I-lysine polypeptide for site-specific drug delivery." Journal of materials chemistry B 5.5 (2017): 935-943 (Year: 2017).*
Lei Ye et al. "Physical Cross-Linking Starch-Based Zwitterionic Hydrogel Exhibiting Excellent Biocompatibility, Protein Resistance, and Biodegradability." Applied Materials and Interfaces, vol. 8, 2016, pp. 15710-15723. (Year: 2016).*
Jinlong Yang, Yinjuan Huang, Chunmei Gao, Mingzhu Liu, and Xinjie Zhang. "Fabrication and evaluation of the novel reduction-sensitive starchnanoparticles for controlled drug release." Colloids and Surfaces B, vol. 115, 2014, pp. 368-378. (Year: 2014).*
English Translation of CN 107653575 A. Originally published in Chinese on Feb. 2, 2018. Translation obtained on Jun. 5, 2025, pp. 1-13. (Year: 2018).*
EP19898005.4 Extended European Search Report dated Oct. 6, 2022.
Ye et al. Physical Cross-Linking Starch-Based Zwitterionic Hydrogel Exhibiting Excellenet Biocompatibility, Protein Resistance, and Biodegradability. Applied Materials & Interfaces vol. 8, No. 24, Jun. 2016, pp. 15710-15723.
International Search Report and Written Opinion for PCT/US2019/065630 on Apr. 2, 2020.
Jiang et al. Self-Healing Zwitterionic Microgels as a Versatile Platform for Malleable Cell Constructs and Injectable Therapies. Advanced Materials 30(39) (Jul. 31, 2018).
Jiang et al. Zwitterionic Fusion in Hydrogels and Spontaneous and Time-Independent Self-Healing Under Physiological Conditions. Biomaterials 35: 3926-3933 (Feb. 20, 2014).
Ma, Guanglong et al., "Determination of non-freezing water in different nonfouling materials by differential scanning calorimetry", Journal of Biomaterials Science, Polymer Edition, vol. 33, No. 8, 2022, pp. 1012-1024.
Zhao, Weiqiang, et al., "A comprehensive study and comparison of four types of zwitterionic hydrogels", Journal of Materials Science, Biomaterials, vol. 53, 2018, 13 pages.

* cited by examiner $R_1, R_2 =$

HYDROGEL COMPOSITIONS BASED ON POLYSACCHARIDES AND ZWITTERIONIC POLYMERS, AND METHODS FOR THEIR USE

CROSS-REFERENCE TO RELATED APPLICATIONS

This application is a continuation of International Application No. PCT/US19/65630, filed Dec. 11, 2019, which claims the benefit of U.S. Provisional No. 62/782,213, filed Dec. 19, 2018, the entire contents of which are incorporated herein by reference.

STATEMENT OF GOVERNMENT LICENSE RIGHTS

This invention was made with Government support under SBIR 1747283 awarded by the National Science Foundation. The Government has certain rights in the invention.

BACKGROUND OF THE INVENTION

This application generally relates to biocompatible hydrogel compositions and more specifically relates to polyzwitterionic-polysaccharide hybrid hydrogel compositions useful for clinical and biomedical formulations and methods for their synthesis and use. Hydrogels are highly hydrated polymer networks that share many properties with natural tissues and have become increasingly common in aesthetic, surgical, and regenerative medical procedures in recent years. However, despite extensive research and development, it has been a challenge to develop safe, functional, and biocompatible polymer materials and hydrogels suitable for clinical implantation or injection. Currently, one of the most prevalent clinical applications of hydrogels is as a soft tissue or dermal filler.

Hydrogels can be organized into various taxonomies depending on their targeted function or intended application. One distinction between hydrogel classes relevant to the present invention is their ability to be degraded, resorbed, or metabolized via one or more physiological, biochemical, or environmental mechanisms. These mechanisms may include ester hydrolysis, disulfide bond cleavage, and enzymatic or proteolytic degradation. Another common distinction between hydrogel classes is their viscoelastic or shear-dependent material properties. Practically, these viscoelastic properties determine whether a hydrogel composition can be injected through a needle or spread on a surface or tissue-injectability in particular is desirable for many non-invasive clinical applications including drug depots, biologic formulations, and cosmetic or reconstructive procedures. A third common distinction between hydrogel classes is their synthetic or biological origin, which is typically related to their macromolecular or polymer network structure. Examples of well-known synthetic hydrogels include crosslinked polyacrylamides, polymethacrylates, and polyethylene glycol. Examples of well-known biologically-derived or naturally occurring hydrogels include chemically or physically cross-linked polysaccharides such as hyaluronic acid (commonly used in its sodium hyaluronate salt form), dextran, and alginate; protein- or amino-acid-derived hydrogels such as gelatin and collagen are also common.

In dermal filler formulations and in other clinical and biomedical applications, hyaluronic acid (HA) is one of the most common components. HA is a naturally occurring, highly biocompatible, and water-soluble polysaccharide, and specifically a glycosaminoglycan. HA is a major component of the extracellular matrix, widely distributed and abundant in humans and other animals. About 15 grams of endogenous HA are present in an average adult. Via the class of enzymes known as hyaluronidases, the human body degrades and resynthesizes about five grams of endogenous HA per day. Hyaluronidases cleave the HA backbone, reducing its high molecular weight (1000+ kDa or 1+ MDa) into oligosaccharides and leading to eventual full metabolism of the HA.

Many clinical formulations based on HA differ from endogenous HA in that they incorporate some degree of chemical crosslinking to stabilize them from rapid degradation and modulate their viscoelastic properties. The most common method of producing crosslinked HA formulations is via 1,4-butandioldiglycidyl ether (BDDE). BDDE-crosslinked HA dermal filler compositions have a typical lifespan of 3-6 months; crosslinking slows or delays enzymatic breakdown but does not prevent degradation indefinitely. A key reason for the recent success of HA-based dermal fillers is their excellent safety record. Localized hyaluronidase application can also be used to quickly degrade the gel after injection in a non-invasive manner, if needed. While this enzymatic reversibility is seen as desirable in many applications, it is tied to a significant technical shortcoming of current HA-based hydrogels: their limited physiological lifespan.

Hydrogels of a synthetic origin have also been used in various clinical and biomedical applications. For example, synthetic polyacrylamide gels crosslinked via methylenebisacrylamide (MBAA) or similar have been approved and used as dermal fillers in some jurisdictions, and polyethylene glycol (PEG) based hydrogels are common in tissue engineering research. These synthetic hydrogels are typically not biodegradable, and if introduced into the human body, are typically considered permanent without surgical intervention. Critically, many hydrogels from this class have been shown to cause more frequent and serious acute and delayed adverse effects related to inflammation and immunogenicity. Nevertheless, their long lifespan is seen by many patients as a desirable feature, even as their immunogenicity has caused their popularity to decline sharply in recent years. In general, synthetic hydrogels are typically more cost-effective to produce at the high purity requisite for clinical use, compared to gels of a biological origin such as HA that must be isolated and purified.

Among all natural and synthetic hydrogel chemistries, polyzwitterionic hydrogels have gained particular attention in recent years because of their uniquely biocompatible attributes. These polymers contain repeated pairs of cationic and anionic groups along their chain, mimicking the phospholipids comprising cell membranes or the mixed-charge surfaces of many proteins. Hydrogels formed from the zwitterionic polymer polycarboxybetaine (polyCB) have been reported to inhibit the foreign body response and resist collagenous capsule formation when implanted in mice, a unique feature among all biomaterials. In addition, stem cells encapsulated in polyCB hydrogels maintain their therapeutic multipotency and can avoid nonspecific differentiation, further supporting the uniquely high biocompatibility of this synthetic material.

Despite the popularity of HA-based injectable hydrogels as dermal fillers, and the large variety of synthetic and other naturally-derived material alternatives and additives investigated, a need exists for injectable and supportive hydrogels that combine high safety and extended physiological lifetime. The present invention seeks to fulfill this need and provides further related advantages.

SUMMARY OF THE INVENTION

The present invention provides hydrogel compositions comprising both polysaccharide-based and polyzwitterionic components, which are crosslinked or intermingled together in a way such that this combined network exhibits material characteristics or clinical utility desirable for biomedical applications.

In one aspect, the invention provides a hydrogel composition comprising a plurality of polyzwitterionic components ($Z^*$) and polysaccharide-based components ($C^*$), wherein one or more $Z^*$ and $C^*$ components are linked by one or more types of chemical or physical associations or bonds, as represented by the following structure:

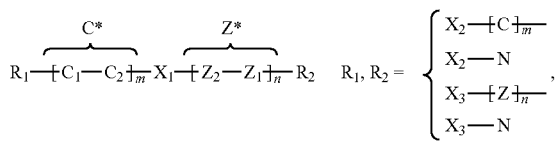

wherein,
- $C^*$ represents a polysaccharide component;
- $C_1$ is a portion of the polysaccharide component, comprising one or more constitutional units of a polysaccharide or polysaccharide salt in its native or naturally-occurring form, or void;
- $C_2$ is a portion of the polysaccharide component, comprising a one or more constitutional units of a polysaccharide or polysaccharide salt modified by one or more chemical or structural modifications, and linked to a polyzwitterionic component $Z^*$ through linking component $X_1$;
- m is an integer from 1 to about 10,000, describing the molecular weight of a representative polysaccharide-based component $C^*$, which may be a random or structured combination of $C_1$ and $C_2$ constitutional units;
- $X_1$ is chemical or physical association or bond linking a polysaccharide-based component to a polyzwitterionic component;
- $Z^*$ represents a polyzwitterionic component;
- $Z_2$ is a portion of the polyzwitterionic component, which may be present along the polymer backbone, at one or more polymer chain termini, or incorporated in a polymer side chain, comprising one or more constitutional units of a zwitterionic polymer or oligomer, linked to a polysaccharide component $C^*$ through linking component $X_1$;
- $Z_1$ is a portion of the polyzwitterionic component, comprising one or more constitutional units of a zwitterionic polymer or oligomer;
- n is an integer from 1 to about 10,000, describing the molecular weight or degree of polymerization of a representative polyzwitterionic component $Z^*$, which may be a random or structured combination of $Z_1$ and $Z_2$ constitutional units;
- $R_1$ and $R_2$ are further components of either a polyzwitterionic ($Z_n$), polysaccharide-based ($C_m$) nature, or other nature (N), which may be linked to any representative $C^*$ or $Z^*$ through linking components $X_2$ or $X_3$; or void.

In some embodiments, the polyzwitterionic component is based on poly(carboxybetaine), poly(phosphocholine), poly (sulfobetaine), poly(phosphobetaine), poly(trimethylamine N-oxide), or poly(ectoine), including functionalized derivatives, copolymers, or pharmaceutically accepted salts.

In some embodiments, the polyzwitterionic component is based on a substantially electronically neutral copolymer having cationic and anionic repeating units, or a mixed-charge copolymer, including mixed-charge peptides.

In some embodiments, the polysaccharide component is a glycosaminoglycan, more specifically based on hyaluronic acid (HA) or any of its pharmaceutically acceptable hyaluronate salts, with or without various degrees of chemical modifications to impart additional chemical functionality that may be necessary for synthesis of the hydrogel composition or other functions.

In some embodiments, the compositions further comprise one or more active agents, such as a drug or additive that provides therapeutic, preservative, material, or cosmetic utility.

In some embodiments, the polyzwitterionic and polysaccharide network structure may be supplemented or blended with one or more additives of cosmetic or therapeutic utility, such as a local anesthetic, peptide, nucleic acid, protein, other biomolecule, nanoparticle(s), microparticle(s), micelle (s), liposome(s), polymersome(s), drug(s), drug precursor (s), or other pharmacologically or biochemically active species.

In some embodiments, the compositions may include polyzwitterionic and/or polysaccharide components that are not crosslinked or otherwise chemically bonded to the crosslinked bulk of the network, for purposes including viscosity modulation or promoting local anesthetic delivery.

In one embodiment, a product is provided comprising hydrogel compositions in the form of an injectable, supportive material suitable for augmenting or replacing lost or damaged tissue, or for providing another cosmetic or regenerative function.

In an exemplary embodiment, the provided composition is highly suitable for augmenting, supporting, enhancing or replacing soft tissue in a patient for cosmetic or regenerative benefit, and is stabilized against premature degradation by enzymes of the hyaluronidase class while remaining reversible by locally injected enzymes of the same class.

In another embodiment, a product is provided comprising hydrogel compositions in the form of an injectable material formulation containing drugs or biomolecules to form a drug depot or other such protective or stabilizing environment for programmed release of said drug or biomolecule.

In another embodiment, a product is provided comprising hydrogel compositions in either hydrated or lyophilized forms that create a cell or tissue culture scaffold suitable for ex vivo cell culture, injectable cell therapy formulation, or other aspects of tissue engineering or cell-based therapies.

The compositions may comprise polyzwitterionic components containing various network branching geometries, hydrodynamic sizes, and molecular weights, which are chemically crosslinked and/or physically entangled with or among themselves and the polysaccharide components.

The compositions may comprise polysaccharide components containing various network branching geometries, hydrodynamic sizes, and molecular weights, which are chemically crosslinked and/or physically entangled with or among themselves and the polyzwitterionic components.

In another aspect, methods for the synthesis and use of such compositions are provided, which have desirable properties for clinical or biomedical applications.

In one aspect, the compositions have a weight ratio of polyzwitterionic-based component to polysaccharide-based component of about 0.01 to about 1000. For example, the weight ratio of polyzwitterionic component to polysaccharide component may be about 1:100, 1:10, 1:1, 5:1, 10:1, 100:1, 500:1, or 1000:1.

In some embodiments, the composition has a total polymer concentration between about 10 mg/mL to 300 mg/mL in the final product at the designed degree of hydration. For example, the total polymer concentration in the composition may be around 15 mg/mL, 25 mg/mL, 75 mg/mL, 100 mg/mL, or 250 mg/mL.

In one embodiment, the composition has a polyzwitterionic component concentration of about 20 mg/mL and a polysaccharide-based component concentration of about 10 mg/mL.

In another embodiment, the composition has a polyzwitterionic component concentration of about 40 mg/mL and a polysaccharide-based component concentration of about 10 mg/mL.

In another embodiment, the composition has a polyzwitterionic component concentration of about 400 mg/mL and a polysaccharide-based component concentration of about 15 mg/mL.

In some embodiments, a portion of the polyzwitterionic component is chemically crosslinked to a portion of the polysaccharide component, wherein the polysaccharide component was previously modified with polymerizable pendant moieties such as methacrylate, acrylate, methacrylamide or acrylamide groups, via a photo-initiated, free-radical mediated polymerization reaction.

In some embodiments, the composition is formed through a two-stage crosslinking reaction, in which part or all of the polysaccharide components are first modified, functionalized, and/or crosslinked, after which the polyzwitterionic components are grafted, combined or attached in a second synthesis step.

In some embodiments, all components are partially or completely dissolved in a pre-reaction solution, which may include zwitterionic monomers or polymers, modified or native polysaccharides such as those based on hyaluronic acid, crosslinked polysaccharides, photo-active free-radical initiation molecules, and other additives. This solution may be degassed under vacuum or purged with inert gas such as nitrogen and exposed to ultraviolet or visible light radiation to initiate a reaction that forms the desired composition. The pH, salinity, and buffering species of this pre-reaction solution may be selected from many available options.

In some embodiments, the post-reaction hydrogel product is equilibrated or dialyzed in aqueous solution of desired pH, salinity and buffering species content for a time between 24 hours and two or more weeks. Typically, this equilibration solution is refreshed once or more per day, to promote hydrogel swelling and the diffusion or dialysis of any unreacted or unwanted impurities to remove them from the hydrogel composition.

In some embodiments, the post-reaction hydrogel product is processed to smaller hydrogels or microgels after polymerization, before or after a dialysis or purification step, using any processing method to grind, mill, extrude, mince, cut, pellet, disperse, homogenize or shear the bulk hydrogels into smaller units, in either hydrated or dry conditions.

In some embodiments, the composition may comprise or contain microgels, produced at or near their final size during the polymerization reaction, such as in a process such as microemulsion polymerization, or derived from one or more bulk hydrogel compositions and sized to their final dimensions after polymerization using any processing step.

In some embodiments, the composition may comprise microgels as discussed above in addition to continuous hydrogel or polymeric phases of the same or different chemical composition.

In some embodiments, the composition is lyophilized after a selected synthesis or manufacturing process step to facilitate a subsequent synthesis or manufacturing step, or to remain in a dehydrated form until use.

In some embodiments, the composition is precipitated in an organic solvent or solvent mixture and dried after a selected synthesis or manufacturing process step to facilitate a subsequent synthesis or manufacturing step, or to remain in a dried, solid, or powder form until use.

In some embodiments, one or more synthesis or processing steps may be carried out under sterile conditions, including sterile filtration of pre-reaction solution, use of aseptic handling, and use of sterile equilibration buffer. Specialized filters, barriers and containers may be used during preparation and processing of the composition, including during or after lyophilization or drying steps.

In some embodiments, the composition may be terminally sterilized before, during, or after packaging in its final container. The final form of the composition may take the form of a lyophilized powder or matrix, or a hydrated gel formulation with a water content below, equal to, or above its equilibrium water content.

Definitions

Certain terms used in the specification are intended to refer to the following definitions, as detailed below. Where the definition of terms departs from the commonly used meaning of the term, applicant intends to utilize the definitions provided below, unless specifically indicated.

The term "monomer" is a polymerizable compound that, on polymerization, contributes one or more constitutional units in the structure of the polymer.

The term "polymer" refers to the product that is the result of polymerization of a single monomer.

The term "copolymer" refers to a polymer that is the result of polymerization of two or more different monomers. The number and the nature of each constitutional unit can be separately controlled in a copolymer. The constitutional units can be disposed in a purely random, an alternating random, a regular alternating, a regular block, or a random block configuration unless expressly stated to be otherwise.

The term "constitutional unit" refers to an atom or group of atoms in a polymer that includes a part of the polymer chain together with its pendant atoms or groups of atoms, if any. The constitutional unit can refer to a repeat unit. The constitutional unit can also refer to an end group on a polymer chain.

The term "repeat unit" corresponds to the smallest constitutional unit, the repetition of which constitutes a regular macromolecule (or oligomer molecule or block).

The terms "hyaluronic acid" or "HA" refer to the well-known polysaccharide and glycosaminoglycan, of any molecular weight average and molecular weight distribution, and can also refer to any of its pharmaceutically acceptable hyaluronate salts, including but not limited to sodium hyaluronate (NaHA), potassium hyaluronate, magnesium hyaluronate, calcium hyaluronate, or combinations thereof.

The terms "zwitterionic polymer" or "polyzwitterionic component" refer to a polymer or copolymer having zwitterionic constitutional units. Zwitterionic constitutional units have pendant groups (i.e., groups pendant from the polymer backbone) that include zwitterionic groups. Representative zwitterionic pendant groups include carboxybetaine groups (e.g., $-R_a-N^+(R_b)(R_c)-R_d-CO_2^-$), where $R_a$ is a linker group that covalently couples the polymer backbone to the cationic nitrogen center of the carboxybetaine groups, $R_b$ and $R_c$ are nitrogen substituents, $R_d$ is a linker group that covalently couples the cationic nitrogen center to the carboxy group of the carboxybetaine group).

The term "functionalized" refers to a monomer, polymer, or copolymer that includes a functional group, that renders the monomer, polymer, or copolymer reactive to covalent coupling to another monomer, polymer, copolymer, or biological or pharmacological species. In the practice of the invention, functionalized monomer, polymers, and copolymers of the invention, which may be polysaccharide-derived, zwitterionic material-derived, or otherwise, react through their functional groups to form covalent bonds that covalently couple the monomers, polymers or copolymers (e.g., crosslink the polymer and copolymers).

The term "autoclave stable" describes a product of composition that is resistant to degradation such as the product of composition maintains at least one, and preferably all, of the following aspects after effective autoclave sterilization: transparent appearance, pH, extrusion force and/or rheological characteristics, polymer concentration, sterility, osmolarity, and concentration of any additives or additional species present in the composition.

The term "lyophilization stable" describes a product of composition that is resistant to degradation such as the product of composition maintains at least one, and preferably all, of the following aspects after full removal of water or aqueous buffer through a lyophilization or freeze-drying procedure: transparent appearance, pH, extrusion force and/or rheological characteristics, polymer concentration, sterility, osmolarity, and concentration of any additives or additional species present in the composition.

All numbers herein expressing "molecular weight" of any polymer or chemical species are to be understood to indicate the weight average molecular weight (Mw) in Daltons.

Unless otherwise specified, "high molecular weight", when referring to any polymeric component of the composition, describes a material having a molecular weight above about 100,000 Da (0.1 MDa), typically not exceeding a molecular weight of about 3,000,000 Da (3 MDa).

Unless otherwise specified, "low molecular weight", when referring to any polymeric, oligomeric, or other chemical species of the composition, or species involved in the production of the composition, or species resulting from degradation of the composition, describes a material having a molecular weight below about 100,000 Da (0.1 MDa).

The term "crosslinking" refers to the intermolecular junctions joining the individual polymer molecules, among or between the polyzwitterionic and/or polysaccharide components of the composition. Specifically, degree of crosslinking or degree of modification is further defined as a dimensionless number or mol % describing the molar amount of crosslinking junctures relative to the total constitutional units in the polymer or polymer composition.

The term "cohesive" as used herein generally refers to the ability of a hydrogel composition to retain its supramolecular properties through certain procedures or treatments.

In some embodiments of the invention, cohesiveness refers to the recovery of selected rheological properties (e.g., elastic modulus), after the composition is subject to varying shear rates (e.g., during injection through a needle) without fracturing into irrecoverable component gel pieces.

The terms "elastic modulus", "storage modulus" or "G' (G-prime)" refer to a rheological property describing the resistance of the hydrogel composition to elastic deformation, expressed in Pa (Pascal). A strong gel has a greater G' than a weak gel under typical conditions.

The terms "viscous modulus", "loss modulus" or "G" (G-double prime)" refer to a rheological property describing the resistance of the hydrogel composition to viscous deformation, expressed in Pa (Pascal). Together with G', G" describes the total resistance to deformation.

The term "microgel" refers to a hydrogel having micron dimensions (i.e., having a diameter that is from about 1 and about 1000 microns).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

FIG. 3A shows the shear-thinning rheological property as demonstrated by an oscillatory strain sweep experiment. In this experiment, the storage (G', solid line) and loss (G", dotted line) moduli are plotted as oscillatory strain is increased from 0.05% to 2000%. FIG. 3B shows a dynamic oscillatory frequency sweep of this same formulation. In this experiment, G' is dominant over G" at all angular frequencies between 0.1 Hz and 100 Hz, showing the elastic network remains in place under a wide range of conditions.

FIG. 4A shows the storage (G', solid line) and loss (G", dotted line) moduli as oscillatory strain is increased from 0.05% to 5000%. The depicted formulation in FIG. 4A is characterized by both G'>1000 Pa at strains below 100%, and a high "crossover" strain of about 500%. FIG. 4B shows the storage (G', solid line) and loss (G", dotted line) moduli as oscillatory strain is increased from 0.1% to 1000%. The depicted formulation in FIG. 4B is a blended composition of two formulations with different ratios of the polyzwitterionic component to the polysaccharide component. FIG. 4C shows the storage (G', solid line) and loss (G", dotted line) moduli as oscillatory strain is increased from 0.1% to 2000%. The depicted formulation in FIG. 4C is a composition formed in a two-step crosslinking reaction.

DETAILED DESCRIPTION OF THE INVENTION

Figure 1:
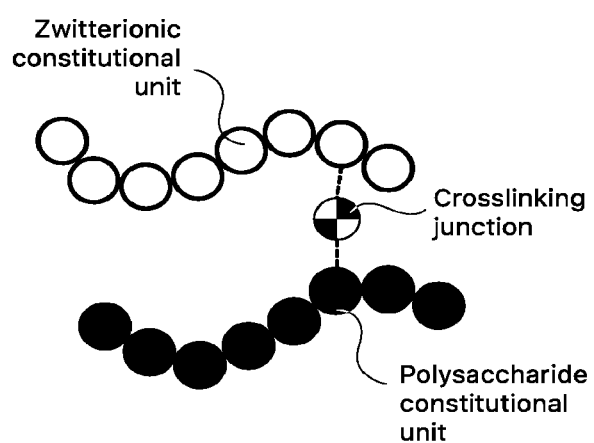
FIG. 1 illustrates a conceptualization of one aspect of the invention. Each unfilled circle represents a zwitterionic constitutional unit of the composition, while each filled circle represents a polysaccharide constitutional unit of the composition. The chains of adjacent constitutional units of the same type are considered a "component". As depicted in FIG. 1, at least one, and potentially many, constitutional unit(s) of each component comprising the disclosed compositions are covalently bonded to at least one, and potentially many, constitutional unit(s) of the other component through "crosslinking junctions". This illustration is only intended to promote understanding of idealized conceptual embodiments of the invention and should not be seen as a quantitatively or chemically accurate representation of molecular structure.
Figure 2:
FIG. 2 illustrates a representative conceptualization of some aspects of the invention. The rope-like depictions in the illustration represent polymer components, and the round symbols at polymer intersection points represent potential crosslinking junctions. As referenced in the legend, the outlined or unfilled components are representative of the polyzwitterionic aspect of the invention, and the solid or filled components are representative of the polysaccharide aspect of the invention. Enzymatic or proteolytic degradation of the composition may produce smaller components such as oligomers, or some components may be completely degraded or metabolized in physiological environments. This conceptual drawing is only intended to promote understanding of one idealized aspect of the invention and should not be seen as a quantitatively or chemically accurate representation of any molecular structures.
Figure 2:
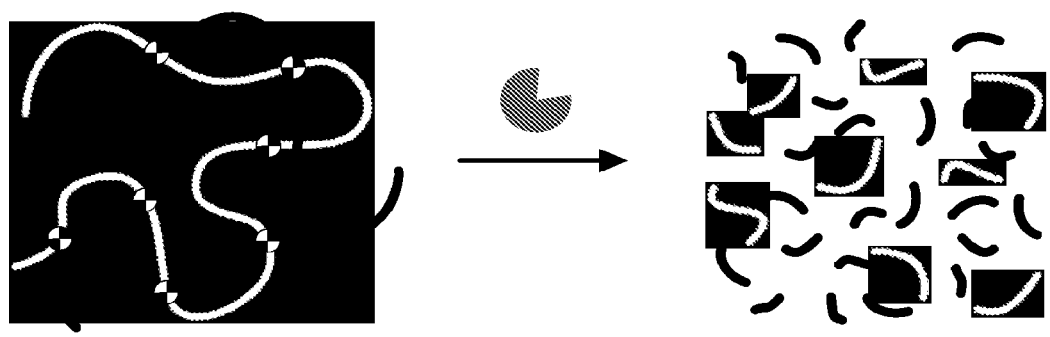
Figure 3A:
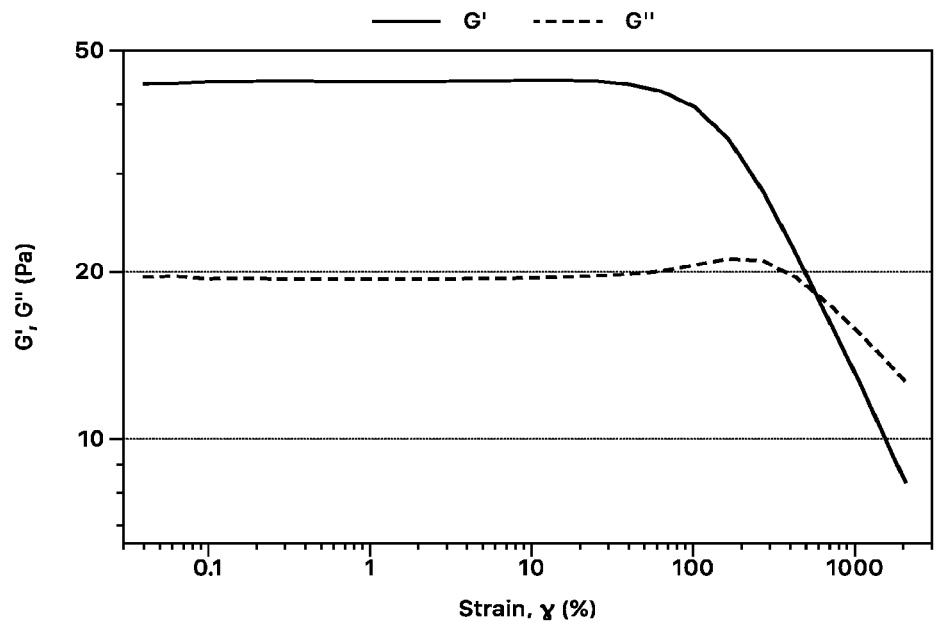
FIG. 3A-3B show representative rheological properties of the same formulation of one embodiment of the invention.
Figure 3B:
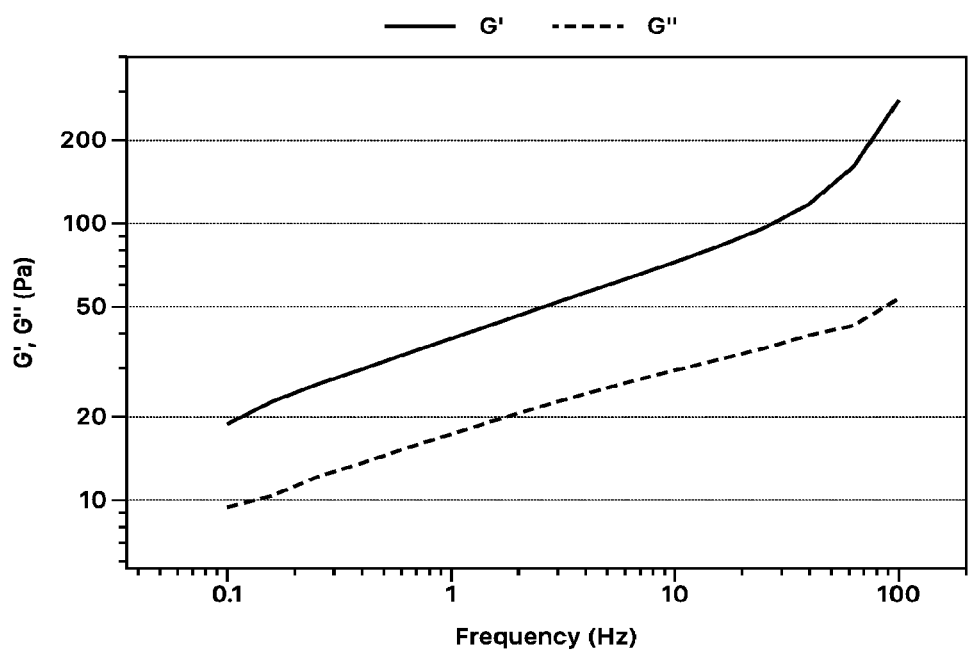
Figure 4A:
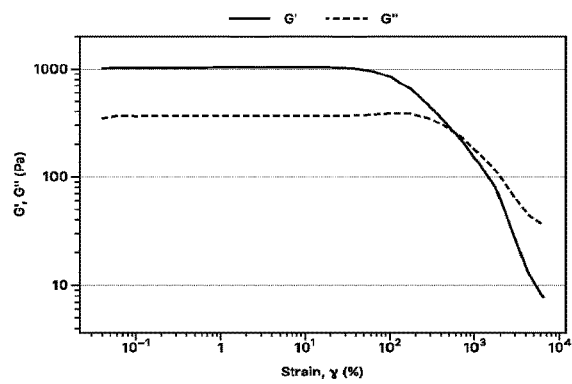
FIG. 4A-4C show representative rheological properties of other selected formulations or embodiments of the invention.
Figure 4B:
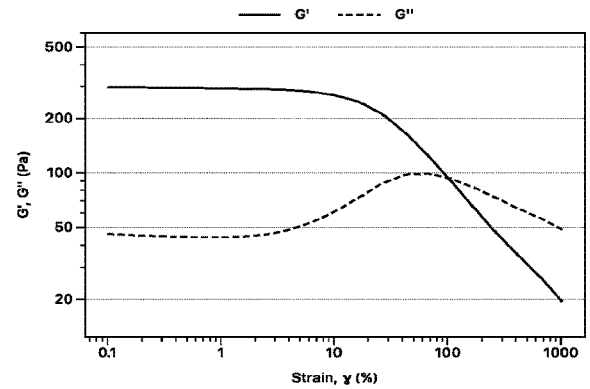
Figure 4C:
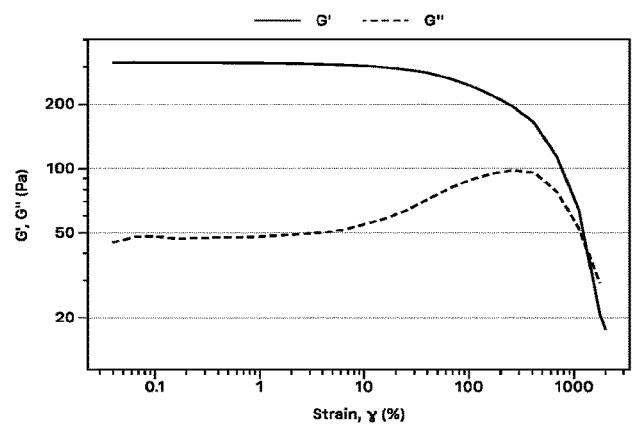

The present disclosure generally relates to biocompatible hydrogel compositions and more specifically relates to hydrogel compositions comprising polyzwitterionic and polysaccharide components, their preparation, and their methods of use.

A hydrogel comprises water or another aqueous phase and a crosslinked macromolecular matrix. Typically, hydrogels of the disclosed compositions comprise a crosslinked molecular matrix containing a polyzwitterionic component ($Z^*$) and a polysaccharide component ($C^*$), wherein one or more $Z^*$ and $C^*$ components are linked by one or more types of chemical or physical associations or bonds, as represented by the following structure (I):

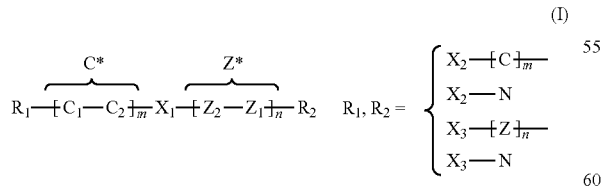

wherein,
$C^*$ represents a polysaccharide component;
$C_1$ is a portion of the polysaccharide component, comprising one or more constitutional units of a polysaccharide or polysaccharide salt in its native or naturally-occurring form, or void;
$C_2$ is a portion of the polysaccharide component, comprising a one or more constitutional units of a polysaccharide or polysaccharide salt modified by one or more chemical or structural modifications, and linked to a polyzwitterionic component $Z^*$ through linking component $X_1$;
m is an integer from 1 to about 10,000, describing the molecular weight of a representative polysaccharide-based component $C^*$, which may be a random or structured combination of $C_1$ and $C_2$ constitutional units;
$X_1$ is chemical or physical association or bond linking a polysaccharide-based component to a polyzwitterionic component;
$Z^*$ represents a polyzwitterionic component;
$Z_2$ is a portion of the polyzwitterionic component, which may be present along the polymer backbone, at one or more polymer chain termini, or incorporated in a polymer side chain, comprising one or more constitutional units of a zwitterionic polymer or oligomer, linked to a polysaccharide component $C^*$ through linking component $X_1$;
$Z_1$ is a portion of the polyzwitterionic component, comprising one or more constitutional units of a zwitterionic polymer or oligomer;
n is an integer from 1 to about 10,000, describing the molecular weight or degree of polymerization of a representative polyzwitterionic component $Z^*$, which may be a random or structured combination of $Z_1$ and $Z_2$ constitutional units;
$R_1$ and $R_2$ are further components of either a polyzwitterionic ($Z_n$), polysaccharide-based (Cn) nature, or any other nature (N), which may be linked to any representative $C^*$ or $Z^*$ through linking components $X_2$ or $X_3$; or void.

In one aspect, the polyzwitterionic component ($Z^*$) is based on a plurality of zwitterionic constitutional units, which may comprise carboxybetaine, phosphorylcholine, sulfobetaine, phosphobetaine, trimethylamine oxide (TMAO), ectoine, or another zwitterionic moiety attached to a polymerizable backbone structure. In some embodiments, representative constitutional units of the polyzwitterionic component may have a formula represented by the following generalized structure (II):

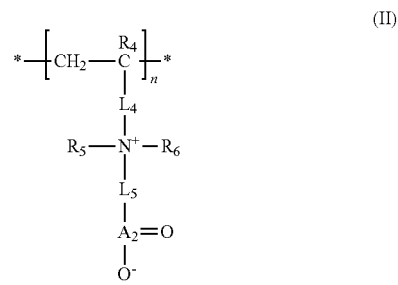

wherein,
$R_4$ is selected from hydrogen, fluorine, trifluoromethyl, C1-C6 alkyl, and C6-C12 aryl groups;
$R_5$ and $R_6$ are independently selected from hydrogen, alkyl, and aryl, or taken together with the nitrogen to which they are attached form a cationic center;
$L_4$ is a linker that covalently couples the cationic center $[N^+(R_5)(R_6)]$ to the polymer backbone $[—(CH_2—CR_4)_n—]$;

L$_5$ is a linker that covalently couples the anionic center [A$_2$(=O)O$^-$] to the cationic center;

A$_2$ is C, S, SO, P, or PO;

n is an integer from about 5 to about 10,000; and represents the point at which the repeating or constitutional unit is covalently linked to either an adjacent repeating unit or a crosslinking juncture.

In one embodiment, R$_4$ is C1-C3 alkyl.

R$_5$ and R$_6$ are independently selected from hydrogen, alkyl and aryl, or taken together with the nitrogen to which they are attached form a cationic center. In one embodiment, R$_5$ and R$_6$ are C1-C3 alkyl.

In certain embodiments, L$_4$ is selected from the group consisting of —C(=O)O—(CH$_2$)$_n$— and —C(=O)NH—(CH$_2$)$_n$—, wherein n is an integer from 1 to 20. In certain embodiments, L$_4$ is —C(=O)O—(CH$_2$)$_n$—, wherein n is 1-6.

In certain embodiments, L$_5$ is —(CH$_2$)$_n$—, where n is an integer from 1 to 20.

In certain embodiments, A$_2$ is C or SO.

In certain embodiments, n is an integer from 5 to about 5,000.

In one embodiment, R$_4$, R$_5$, and R$_6$ are methyl, L$_4$ is —C(=O)O—(CH$_2$)$_2$—, L$_5$ is —(CH$_2$)—, A$_1$ is C, and n is an integer from 10 to about 1,000.

In preferred embodiments, the polyzwitterionic component may be based on constitutional units formed by reacting one or more varieties of carboxybetaine acrylamide monomers or monomer derivatives in a polymerization reaction. Representative structures of certain carboxybetaine acrylamide monomers, known as carboxybetaine acrylamide-1 (CBAA-1), carboxybetaine acrylamide-2 (CBAA-2), and a representative carboxybetaine acrylamide-2-ester (CBAA-2-ester) are shown below in (III):

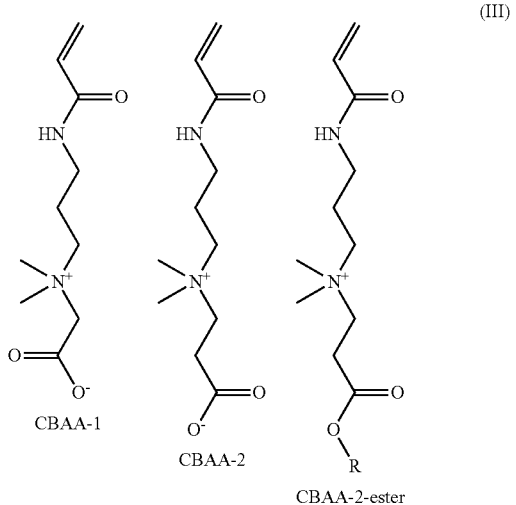

(III)

wherein the 'R' group in CBAA-2-ester may be any group capable of covalent linkage to CBAA-2 via such a bond, selected for any reason.

In certain embodiments, the polyzwitterionic component may be a mixture of polycarboxybetaine-based monomers or polymers and other classes of ionic or non-ionic monomers or polymers, or a copolymer of polycarboxybetaine and other classes of ionic or non-ionic monomers, or a mixture or copolymer of cationic and anionic monomers/polymers such that the overall character of the polyzwitterionic component is substantially zwitterionic, mixed charge, or resists protein adhesion and nonspecific biological interactions.

In certain embodiments, the polyzwitterionic component may include functionalized carboxybetaine-based monomers, oligomers, or polymers, which in certain embodiments incorporates: (a) one of a reactive pair selected from an azide and an alkyne, an azide and an alkene, a thiol and a maleimide, a thiol and an alkene, a thiol and a disulfide, a thiol and a norbornene, or any other 'click', bioorthogonal, or other reactive pair; wherein, (b) said functional group is positioned at the terminus of a polymeric structure or as a pendant group functionalized to a constitutional unit side chain, or distinct comonomer.

In certain embodiments, the polyzwitterionic components may contain various network branching geometries, hydrodynamic sizes, and molecular weights, which are chemically crosslinked and/or physically entangled with or among themselves and the polysaccharide components.

In another aspect, the polysaccharide component (C*) is based on a plurality of constitutional units having a general sequence recognized by those of ordinary skill in the art as a polymer of monosaccharides, disaccharides, or oligosaccharides, or any combination of native and chemically modified versions of these.

In certain embodiments, the polysaccharide component is based on native or chemically modified agar, alginates, carrageenan gum, cellulose, chitosan, chitin, cyclodextrin, dextran, gellan gum, glycogen, gum karaya, inulin, pectin, polydextrose, xanthan gum, or any other starches, gums or other polysaccharides, including functionalized derivatives, dextrinized, hydrolyzed, oxidized, alkylated, hydroxyalkylated, acetylated, fractionated, and physically modified starches and any pharmaceutically acceptable salts thereof.

In certain embodiments, the polysaccharide component may be based on a glycosaminoglycan, a particular class of polysaccharide which includes sodium hyaluronate and other salts of hyaluronic acid, as well as chondroitin sulfate, heparin sulfate, and other examples.

In preferred embodiments, the polysaccharide component is based on hyaluronic acid (HA), also referred to as sodium hyaluronate or hyaluronan, which is a non-sulfated glycosaminoglycan that typically comprises disaccharide units of D-glucuronic acid (GlcUA) and N-acetyl-D-glucosamine (GlcNAc), which are alternately linked, forming a linear polymer. Naturally occurring HA enhances water retention, resists hydrostatic stresses, is non-immunogenic and common in the human body, and can be chemically modified if desired. The structure of HA is shown below in (IV):

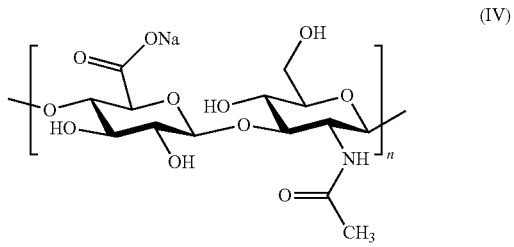

(IV)

In certain embodiments, the polysaccharide component, polyzwitterionic component, or crosslinking junctions may have susceptibility to degradation through enzymatic, proteolytic, hydrolytic or other mechanisms (i.e., are biodegradable). These mechanisms may include ester hydrolysis, disulfide bond cleavage, and other forms of enzymatic or proteolytic degradation.

In exemplary embodiments, the polysaccharide component is based on HA having one or more chemical modifications to impart additional functionality that may be necessary for synthesis of the complete composition.

In certain embodiments, portions of the polysaccharide component may first be modified with one or more polymerizable pendant moieties such as a methacrylate, acrylate, methacrylamide, acrylamide or other acryloyl group, to allow crosslinking via a free-radical mediated polymerization reaction.

In certain embodiments, the polysaccharide component comprises a crosslinked HA network formed prior to synthesis of the complete composition of the invention, using an HA crosslinking method known to those of skill in the art; for example, via 1,4-butandioldiglycidyl ether (BDDE) in aqueous alkaline conditions.

In certain embodiments, the molecular weight of HA, modified HA or another polysaccharide component may vary. For example, HA may have a molecular weight of about 10,000 Da to about 10,000,000 Da, about 50,000 Da to about 5,000,000 Da, or about 100,000 Da to about 3,000,000 Da, or about 1,000,000 Da (1 MDa).

The compositions may comprise polysaccharide components containing various network branching geometries, hydrodynamic sizes, and molecular weights, which are chemically crosslinked and/or physically entangled with or among themselves and the polyzwitterionic components. After a reaction crosslinking the polysaccharide or HA component to the polyzwitterionic component occurs, the resulting crosslinked macromolecular product may contain some polysaccharide or HA components of increased, decreased, or comparable molecular weight to the polysaccharide or HA components in the pre-reaction solution. The term "molecular weight" is applied in this situation to a portion of the matrix, even though the polysaccharide of HA component may not actually be a distinct or separate molecule due to the crosslinking.

In some embodiments, the compositions may include polyzwitterionic and/or polysaccharide components that are not chemically bonded to the majority of the network, for purposes including viscosity modulation or local anesthetic delivery.

In another aspect, at least one, and potentially many, constitutional unit(s) of some portion of the polyzwitterionic component is linked to least one, and potentially many, constitutional unit(s) of some portion of the polysaccharide component through any chemical or physical association or entanglement.

In certain embodiments, the crosslinking junctions may include chemical structures that are functionalized to the polysaccharide and/or polyzwitterionic components before or during the reaction forming the final composition.

In some embodiments, crosslinking junctions may be formed from one or more groups containing one or more acrylate, methacrylate, acrylamide, methacrylamide or other acryloyl-containing groups reactive in a radical-mediated polymerization reaction.

In some embodiments, crosslinking junctions may contain maleimide, norbornene, alkyne, alkene, thiol, azide or other reactive groups, or other bioorthogonal crosslinking chemistries and 'click' chemistries, such as azide/alkyne (including SPAAC) and thiol-ene chemistries.

In some embodiments, crosslinking junctions may contain or their formation mediated by coupling agents such as carbodiimides such as N,N'-dicyclohexylcarbodiimide (DCC), N,N'-diisopropylcarbodiimide (DIC), or 1-ethyl-3-(3-dimethylaminopropyl)carbodiimide (EDC), to facilitate ester or amide bond formation, either without becoming part of the linkage or becoming part of the linkage.

In certain embodiments, crosslinking junctions may contain enzymatically or proteolytically degradable groups, selected from disulfide bonds, esters, anhydrides, enzymatically cleavable peptides (such as matrix metalloproteinase [MMP]-cleavable peptide motifs), or chemistries responsive to external stimuli such as light or heat.

In certain preferred embodiments, a portion of the polyzwitterionic component is chemically crosslinked with a polysaccharide component, which itself was previously modified with polymerizable pendant moieties such as methacrylate, acrylate, methacrylamide or acrylamide groups, via a photo-initiated or thermally initiated radical mediated polymerization reaction.

Reaction Conditions

A crosslinking reaction mixture can react to form a crosslinked macromolecular matrix. In some embodiments, all components are dissolved in an aqueous pre-reaction solution, in which all components are soluble. These components may include zwitterionic monomers or polymers, modified or native polysaccharides such as those based on hyaluronic acid, photo-active free-radical initiation molecules, and other additives. Reaction conditions such as the concentrations of HA, functionalized or modified HA, zwitterionic monomers, zwitterionic polymers, initiators, catalysts, or additives, as well as the pH of the solution, temperature of the solution, and salt concentration, may be adjusted to help to prevent polyionic complex formation or insolubility of any component in the reaction solution. The pH, salinity, and buffering species of this pre-reaction solution may be selected from many available options.

In some embodiments, polysaccharide-based components such as HA may be first crosslinked using a crosslinking chemistry known to those of skill in the art; for example, via 1,4-butandioldiglycidyl ether (BDDE) in aqueous alkaline conditions, and then processed and/or dried via lyophilization or precipitation before further crosslinking to the polyzwitterionic component. The organic solvents, pH, salinity, and buffering species included in either the primary or secondary reaction solution may be selected from many available options.

In some embodiments, pre-reaction solutions may be degassed under vacuum or purged with inert gas such as nitrogen or argon prior to initiating a radical-mediated crosslinking or polymerization reaction. In some embodiments, pre-reaction solution degassing or purging may not be necessary.

In some embodiments, an aqueous pre-reaction solution or a crosslinking reaction mixture may further comprise about 1% to about 50% of an organic solvent such as ethanol, methanol, isopropanol, DMSO, or similar.

In some embodiments, the pre-reaction solution including a photo-active free radical initiator is exposed to ultraviolet or visible light radiation to initiate a reaction that forms the desired composition. This photo-active initiator may be chosen from a wide variety of commercially available or custom-synthesized molecules known to those skilled in the art. In exemplary embodiments, this photo-active initiator may be the water-soluble and biocompatible species 2-hydroxy-1-[4-(2-hydroxyethoxy)phenyl]-2-methylpropan-1-one, also known as Irgacure 2959, Darocur 2959, or simply '2959'.

In some embodiments, the pre-reaction solution including a thermally-active free radical initiator is exposed to heightened temperature to initiate a reaction that forms the desired composition. This thermal initiator may be chosen from a wide variety of commercially available or custom-synthesized molecules known to those skilled in the art, such as 2,2'-Azobisisobutyronitrile, also known as AIBN.

In one aspect, the weight ratio of polyzwitterionic-based components or precursors to polysaccharide-based components or precursors in the pre-reaction solution is about 0.01 to about 1000. For example, the weight ratio of polyzwitterionic component to polysaccharide component may be about 1:10, 1:1, 5:1, 10:1, 100:1 or 500:1.

In some embodiments, the composition has a total polymer concentration between about 10 mg/mL to 300 mg/mL in the final product at the designed hydration content. For example, the total polymer concentration in the composition may be around 25 mg/mL, 33 Mg/mL, 50 mg/mL, 75 mg/mL, 100 mg/mL, or 250 mg/mL.

In certain embodiments, the composition has a polyzwitterionic component concentration of about 90 mg/mL and a polysaccharide-based component concentration of about 10 mg/mL, or a polyzwitterionic component concentration of about 99 mg/mL and a polysaccharide-based component concentration of about 1 mg/mL, a polyzwitterionic component concentration of about 40 mg/mL and a polysaccharide-based component concentration of about 15 mg/mL, or a polyzwitterionic component concentration of about 20 mg/mL and a polysaccharide component concentration of about 10 mg/mL.

In certain embodiments, a crosslinking reaction mixture may comprise glycidyl methacrylate-modified HA at a concentration of about 10 mg/mL, carboxybetaine acrylamide monomer at a concentration of about 20 mg/mL, Irgacure 2959 at a concentration of about 0.5 mg/mL, and sodium chloride at a concentration of about 0.9 wt % or about 150 mM.

In certain embodiments, a crosslinking reaction mixture may comprise glycidyl methacrylate-modified, BDDE-crosslinked HA microgels, suspended at a concentration of about 10 mg/mL, carboxybetaine acrylamide monomer at a concentration of about 20 mg/mL, Irgacure 2959 at a concentration of about 0.5 mg/mL, and sodium chloride at a concentration of about 0.9 wt % or about 150 mM.

In certain embodiments, a crosslinking reaction mixture may comprise glycidyl methacrylate-modified HA at a concentration of about 10 mg/mL, carboxybetaine acrylamide monomer at a concentration of about 80 mg/mL, Irgacure 2959 at a concentration of about 0.5 mg/mL, and sodium chloride at a concentration of about 0.9 wt % or about 150 mM.

In certain embodiments, a crosslinking reaction mixture may comprise glycidyl methacrylate-modified HA at a concentration of about 3 mg/mL, carboxybetaine acrylamide monomer at a concentration of about 500 mg/mL, Irgacure 2959 at a concentration of about 0.5 mg/mL, and sodium chloride at a concentration of about 0.9 wt % or about 150 mM.

In certain embodiments, the reaction mixture may be transferred or injected into a glass or other sufficiently UV transparent casting mold and exposed to ultraviolet light for about 10 seconds to about 1 hour, or about 30 seconds to about 30 minutes, or about 1 minute to about 10 minutes.

In certain embodiments, the reaction mixture may be transferred or prepared in an open-top container or containers from about 1 mm to about 10 cm in height, and exposed to ultraviolet light, in order to exploit a geometric phenomenon known as 'photo-frontal polymerization'.

In certain embodiments, the reaction mixture may be exposed to ultraviolet light of any wavelength or combination of wavelengths, such as about 254 nanometers (nm), about 300 nm, or about 365 nm. The source of this light may be an ultraviolet crosslinking oven, handheld ultraviolet lamp, ultraviolet light-emitting diode (LED) device, or any other industrial, commercial, or custom-fabricated ultraviolet light source, or natural ultraviolet light source such as the Sun.

Processing

In some embodiments, the post-reaction hydrogel product is removed from its casting mold or other container and equilibrated in aqueous solution of desired pH, salinity and buffering species content for a time between about 24 hours and about two or more weeks. Typically, this equilibration solution is refreshed once or more per day, to promote hydrogel swelling to its equilibrium hydration as well as the diffusion or dialysis of any unreacted or unwanted impurities to remove them from the hydrogel composition.

In preferred embodiments, the buffer solution may be a phosphate buffered saline solution that may comprise phosphate buffer, potassium chloride, and sodium chloride, and have a pH between about 7 and about 8. A phosphate buffer solution may be substantially isosmotic with respect to human physiological fluid.

In certain embodiments, gentle agitation or fluid convection, via a process such as shaking, rocking, stirring, or fluid circulation, is used to enhance the speed or efficiency with which the post-reaction hydrogel product is equilibrated and purified in the equilibration solution.

In certain embodiments, after a crosslinking reaction and additional processing steps such as equilibration have occurred, the crosslinked macromolecular matrix may be particulated or homogenized. For example, this particulation or homogenization process may be carried out through any processing step capable of grinding, extruding, mincing, cutting, shearing, or pelleting the bulk hydrogels to smaller units. This particulation step may be conducted on wet (over-hydrated, under-hydrated, or equilibrium hydrated), or dry (lyophilized, dehydrated or precipitated) hydrogel material. This particulation step may be designed to enable injection of the final composition through a needle.

In an exemplary embodiment, the particulation step used to homogenize the crosslinked macromolecular matrix is extrusion through a mesh. A mesh used for particulating the matrix may have any suitable pore size depending upon the size of particles desired. In some embodiments, the mesh may have a pore size of about 10 microns to about 500 microns, about 40 microns to about 100 microns, or about 50 to about 70 microns. The composition may be extruded through this mesh one or multiple times, using any technique capable of generating sufficient force or pressure.

In some embodiments, the final composition may be an aggregated collection of microgels, produced at or near their final size during the polymerization reaction, such as in a process such as microemulsion polymerization. Alternatively, the microgels may be sized to their final dimensions after derivation from bulk hydrogels, using any method of particulation or homogenization discussed above.

In some embodiments, a hydrogel composition or particulated formulation may be treated by dialysis for sterilization, further purification, salt or ion exchange, or other purposes. Dialysis may be carried out by placing a semipermeable membrane between the hydrogel and another liquid so as to allow the hydrogel and the liquid to exchange molecules or salts that can pass between the membrane. The dialysis may be carried out against a buffer solution or sterile buffer solution.

In preferred embodiments, the buffer solution may be a sterile phosphate buffered saline solution that may comprise phosphate buffer, potassium chloride, and sodium chloride.

Thus, when dialysis is complete, the liquid component of a hydrogel may be substantially isosmotic with respect to human physiological fluid.

In some embodiments, the composition is lyophilized (freeze-dried) to a dehydrated powder after a selected synthesis or processing step for storage, transport, sterilization, or further processing. In certain embodiments, the lyophilized composition is rehydrated with any aqueous fluid, including but not limited to water, saline or ionic solutions, isosmotic solutions with respect to human physiological fluid, human blood plasma or other blood components, cell growth or preservation media containing or not containing cells, or any other physiologically relevant solution which may contain drugs, protein therapies, nucleic acid therapies, cells, nanoparticles, or microparticles.

In some embodiments, between one and all synthesis and/or processing steps may be carried out under sterile conditions, including sterile filtration of pre-reaction solution, aseptic handling, and use of sterile equilibration or dialysis buffers. Specialized filters, barriers and containers may be used during preparation and processing of the composition, including during and after lyophilization.

In some embodiments, the composition may be terminally sterilized before or after being packaged in its final container, such as a prefillable syringe. The final composition may take the form of a lyophilized powder or matrix, or a hydrated gel formulation with a water content below, equal to, or above its equilibrium water content.

Material Characteristics

Measurement of viscoelastic or rheological properties may quantify or predict the clinical utility of a particular formulation, such as whether a hydrogel composition can be injected through a needle, spread on a surface or tissue, or be expected to create a supportive tissue-mimetic structure after injection or implantation in the human body. In some embodiments, injectable compositions are specifically desirable for non-invasive clinical applications, which may include drug depots, biologic formulations or excipients, cell-protective scaffolds or extracellular matrix-mimetic materials, or cosmetic or reconstructive procedures.

In certain embodiments, the hydrogel composition may exhibit a storage modulus or G' value of about 1 Pa to about 10,000 Pa, about 50 Pa to 5,000 Pa, about 100 Pa to about 1000 Pa, about 200 Pa to about 600 Pa, or any value in a range bounded by, or between, any of these values.

In certain embodiments, the hydrogel composition may exhibit a loss modulus or G" value of about 1 Pa to about 1000 Pa, about 5 Pa to about 1000 Pa, about 10 Pa to about 200 Pa, about 20 Pa, about 50 Pa, about 100 Pa, or any value in a range bounded by, or between, any of these values.

In certain embodiments, the hydrogel composition may exhibit a tan $\delta$ value, defined as G"/G' of a particular composition under particular conditions, of about 0.01 to 1.5, about 0.05 to 0.5, about 0.07 to 0.4, about 0.1, or any value or range bounded by, or between, any of these values. In exemplary embodiments the tan $\delta$ value is typically recorded at a strain of about 1% and constant angular frequency of about 10 rad/s, during oscillatory strain sweep rheological experiments.

In certain embodiments, the hydrogel composition may exhibit a crossover strain value, also known as 'xStrain' or the strain at which tan $\delta=1$, and further defined as G"=G', of about 30% to about 10,000%, about 50% to about 2000%, about 70% to about 1500%, or about 100%, about 400%, about 700%, or about 1200%, or any value or range bounded by, or between, any of these values. In exemplary preferred embodiments, the crossover strain value is greater than 100%, as recorded during oscillatory strain sweep rheological experiments.

In some embodiments, the hydrogel composition may have an average extrusion force of about 15 N to 40 N, or about 30 N, when the hydrogel is forced through a 30 G needle syringe by moving the plunger of a 1 mL syringe containing the hydrogel at a rate of 100 mm/min for about 10 mm, and measuring the average force once it plateaus.

In some embodiments, the hydrogel composition may further comprise a liquid. For example, the composition may absorb an aqueous liquid so that a hydrogel is formed. An aqueous liquid may comprise water with a salt dissolved in it, such as a phosphate buffer, sodium chloride, potassium chloride, etc. In some embodiments, an aqueous liquid may comprise water, sodium chloride at a concentration of about 100 mM to about 200 mM, potassium chloride at a concentration of about 2 mM to about 3 mi, and phosphate buffer at a concentration of about 5 mM to about 15 mM, wherein the pH of the liquid is about 7 to about 8.

In some embodiments, a phenomenon known as "zwitterionic fusion" may contribute to the material or rheological properties of the disclosed composition. Zwitterionic fusion may integrate strong hydration, intermolecular zwitterion pair attraction, and H-bonding between side chains and backbone amides to facilitate time-independent self-healing in some zwitterionic materials, as described in Jiang et al., Biomaterials, 35, 2014, 3926 and Jiang et al., Advanced Materials. 30, 2018, 1803087.

In some embodiments, physical interactions of any type including ionic interactions, hydrogen bonding, hydrophobic interactions, interactions with biomolecules or nanoparticles of a natural or synthetic origin, or any other reversible or nonreversible physical interactions may contribute to the material or rheological properties of the disclosed composition.

Products and Applications

Dermal Filler

Some embodiments may include a soft tissue filler product; for example, an injectable dermal or subdermal filler. A filler comprising a hydrogel composition may be any kind of filler that is suitable for injecting into human tissue to improve an aesthetic quality of a soft tissue, such as a dermal filler, a breast augmentation or reconstruction filler, a lip filler, or filler suitable for other soft tissue restoration or augmentation.

Some embodiments include a packaged product comprising a syringe loaded with the hydrogel composition and a needle. The syringe may be packaged or fitted with a needle of any size that is appropriate for injecting the hydrogel into the soft tissue of interest, such as a needle with about a #25, about a #27, or about a #30 gauge. The syringe may incorporate various accessories or attachments to promote an ergonomic, safe, and well-controlled injection technique, which may include extended finger flanges, enlarged plunger rods, color-coded packaging, or other components such as rubberized, curved or grooved geometries or syringe features.

A tissue filler comprising the hydrogel composition may be suitable for injection if it can be injected into the soft tissue of interest without unreasonable difficulty, including fillers that can be dispensed from cannulas having gauge as low as about 30 G or about 25 G under normal manual pressure with a smooth extrusion plateau.

Drug Delivery

In some embodiments, the hydrogel composition comprising crosslinked polyzwitterionic and polysaccharide components may be supplemented or blended with one or more additives of cosmetic or therapeutic utility, such as a local anesthetic, peptide, nucleic acid, protein, other biomolecule, nanoparticle(s), microparticle(s), micelle(s), liposome(s), polymersome(s), drug, drug precursor, or other pharmacologically or biochemically active species.

In some embodiments, the hydrogel composition may be used to provide a delivery mechanism for a cosmetic agent to a subject, comprising contacting a subject with an embodiment of the disclosed composition, wherein the composition comprises crosslinked polyzwitterionic and polysaccharide components and optionally an effective amount of a cosmetic agent (e.g., preservative, vitamin, hormone, anti-inflammatory agent, antibiotic, moisturizer, anti-acne (benzyl peroxide, retinoid, erythromycin and other antibiotic, azelaic acid, linoleic acid, salicylic acid, hormone, fruit acids, zinc oxide), anti-allergic or anti-eczema (corticoid, antihistamine, local anesthetic), firming (retinoid, antibiotic including minocycline, doxycycline, metronidazole, azelaic acid), anti-bedsores or decubitus (D-panthenol, antibiotic, anti-inflammatory, re-fattening cream base), or anti-inflammation (antibiotic, antimyocotic, antihistamine, immunosuppressive agent, corticoid, chamomile, calendula, D-panthenol) agent or therapeutic species)

Cell and Tissue Engineering

In another aspect, a product is provided comprising hydrogel compositions in either hydrated or lyophilized forms that create a cell or tissue culture scaffold suitable for ex vivo cell or tissue culture, injectable cell therapy formulation components, or both.

In some embodiments, the provided hydrogel composition comprises all or part of a biocompatible material used in cell or tissue culture and expansion applications; for example, as a scaffold, matrix, or other growth substrate in small or large-scale settings and in any container or bioreactor, particularly when cell growth or differentiation must be controlled, expansion without differentiation or phenotype change is desired, or separation of cells and scaffold or matrix material must be done through size-based washing without any additional reagents.

In some embodiments, the provided hydrogel composition comprises a biocompatible material composition used in cell or tissue storage or preservation applications; for example, as a preservation additive, formulation, scaffold, matrix, surface coating, cryoprotectant, or similar application.

The provided hydrogel composition can be used as a scaffold, matrix, or other substrate for the growth, maintenance or expansion of cells, tissues, or organs, in which a construct of the biological material and hydrogel composition can be maintained using any culture or maintenance method or apparatus including any type of bioreactor, and can be derived from lineages including, but not limited to:

(a) pluripotent and multipotent stem and progenitor cells, including (1) embryonic stem cells (ESCs), tissue-derived stem cells (e.g., from skin, blood, or eye), hematopoietic stem and progenitor cells (HSPCs) derived or purified from umbilical cord blood or bone marrow, mesenchymal stem cells, or induced pluripotent stem cells (iPSCs), (2) genetically modified or transfected stem and progenitor cells; and (3) cancer stem cells (CSCs);

(b) hematopoietic cells typically circulating in human blood, including red blood cells (erythrocytes), white blood cells (leukocytes) and platelets (thrombocytes);

(c) immune cells and progenitors or differentiated lineages thereof, including (1) T cells expressing the CD8 surface glycoprotein, particularly including naïve cytotoxic T lymphocytes (CTLs or $T_C$s) and differentiated or activated lineages thereof including central memory ($T_{CM}$) T cells; (2) T cells expressing the CD4 surface glycoprotein, particularly including naive helper T lymphocytes ($T_H0$), and differentiated or activated lineages thereof including $T_H1$, $T_H2$, $T_H9$, $T_H17$, $T_{FH}$, $T_{REG}$, and central memory ($T_{CM}$) T cells; (3) regulatory T cells ($T_{REG}$) from any source, either natural Tregs or induced Tregs; (4) natural killer T cells (NKT cells); (5) chimeric antigen receptor T cells (CAR-T); and (6) genetically modified T cells; (6) B cells; (7) dendritic cells, and (8) other antigen-presenting cells (APCs) or immune cells not specifically listed above;

(d) pancreatic islet or other insulin-producing cells and β-cells useful in the treatment and management of diabetes;

(e) nervous system cells and progenitors;

(f) cardiovascular system cells and progenitors; and (g) other cells, particularly those useful in the fields of immunotherapy, regenerative medicine, hematologic diseases or malignancies, or cancer vaccines or treatments.

(h) tissues, including muscle (skeletal, smooth, cardiac, vasculature including blood vessels), nerve tissue (peripheral nervous tissue, central nervous tissue including tissue comprised of neuroglia that are astrocytes, microglial cells, ependymal cells, oligodendrocytes, satellite cells, or Schwann cells), connective tissue (cartilage, elastic cartilage, fibrocartilage, bone tissue, white adipose tissue, brown adipose tissue, fascia, blood), subcutaneous tissue, or epithelial tissue (squamous epithelium, cuboidal epithelium, columnar epithelium, stratified epithelium, pseudostratified epithelium, transitional epithelium);

(i) organs, including kidney, heart, brain (cerebrum, cerebral hemispheres, dencephalon), brainstem (midbrain, pons, medulla oblongata, cerebellum, spinal cord, ventricular system, choroid plexus), esophagus, pharynx, salivary glands (parotid glands, submandibular glands, sublingual glands), stomach, small intestine (duodenum, jejunum, ileum), large intestine, liver, gallbladder, pancreas, nose (nasal cavity, pharynx, larynx, trachea, bronchi, lungs), Ureters, bladder, urethra, arteries, veins, capillaries, lymphatic vessel, lymph node, bone marrow, thymus, spleen, gut-associate lymphoid tissue (tonsils), eye, ear, olfactory epithelium, tongue, or skin.

The provided hydrogel composition can be used as a biocompatible material, scaffold, formulation component or contacting material for any method of preserving cells or tissues or retaining their biological function for clinical or military utility, particularly for cell types that are difficult to preserve with conventional methods such as blood cells (e.g., platelets and red blood cells) for extended time periods, at room or low temperatures, in whole blood or preservation solutions, and with or without the presence of DMSO, glycerol, glycine betaine or other osmolytes or cryoprotectants.

Other Applications

In some embodiments, the hydrogel composition may be used to provide materials or products with non-Newtonian behavior (e.g., that exhibit viscoelastic, rheopectic, thixotropic, shear thickening (dilatant), shear thinning (pseudoplastic), and/or Bingham plastic properties).

In some embodiments, the hydrogel composition may be used to provide self-healing materials and/or shape memory materials, or similar classes of 'smart' materials that can repair damage or recover their properties after damage or external stimuli.

In some embodiments, the hydrogel composition may be used to provide antifouling materials or surface coatings to prevent nonspecific protein or other biomolecule adsorption (e.g., for marine applications, drug delivery platforms, biosensors and other medical devices, vascular grafts, intravascular stents, cardiac valves, joint replacements, and other materials and devices that come into contact with physiological environments).

In some embodiments, the hydrogel composition may be used to provide injectable or spreadable materials for biomedical applications such as surgical procedures or wound healing.

In some embodiments, the hydrogel composition may be used to provide an injectable or spreadable material for biomedical applications, particularly in applications requiring non-Newtonian fluid properties and high biocompatibility, such as (a) injectable or spreadable materials capable of mechanical support, such as those used in cosmetic or reconstructive surgery, blood vessel prostheses, skin repair devices, cochlear replacements, injectable vitreous substances, artificial cartilage, artificial fat, collagen-mimics and other soft tissue-mimics or supports; (b) injectable or spreadable materials with desirable or specific biological interactions with a surface or tissue, particularly when nonspecific interactions should be avoided or a desired balance of nonspecific/specific interactions must be achieved; and (c) injectable or spreadable carriers to deliver and/or protect or shield drugs, biomolecules (e.g., nucleic acids, peptides, proteins, polysaccharides), cells (e.g., pancreatic islets, cardiovascular cells, stem cells, immune cells, blood cells), nanoparticles or microparticles (e.g., PLGA/drug formulations), micelles, liposomes, polymersomes, or other therapeutic species or drug delivery modalities, for surgical applications, therapeutic applications, wound healing, and drug delivery formulations.

EXAMPLES

The following examples are provided for the purpose of illustrating, not limiting the invention:
Examples of Analytical Methods Example 1—Determination of Total Polymer Concentration of the Compositions To determine the total polymer concentration of each hydrogel composition, the weight of a known volume of the hydrated gel is compared to that of same sample after drying or lyophilization. For example, a 1-mL sample of gel is weighed and dried by a process such as: 1) precipitation in organic solvent such as an alcohol followed by vacuum drying; or 2) flash-freezing in liquid $N_2$ followed by lyophilization at −54° C. and 0.04 Torr. A solution of the appropriate buffer containing any other additives present in the composition is also weighed and dried in the same fashion to account for salt content of the gel. The total solids content of the gel is calculated by dividing the dry weight by the wet volume, assuming 1 g/mL density for the wet gel, to give a value in mg/mL. The content of salt solids and any other additives is then subtracted from this value to determine the total polymer concentration in the hydrogel composition.

Example 2—Rheological Characterization of the Compositions

Rheological measurements of the compositions are performed as follows. A TA Instruments DHR-2 rheometer outfitted with a Peltier plate for temperature control and parallel plate geometry (20-mm diameter, plate-to-plate gap distance of 800 μm) is used for all measurements. Oscillatory mode is used for all experiments. In each experiment, G', G", complex viscosity (η) and tan δ (G"/G') are recorded at each measurement point. The elastic modulus (G') describes the hydrogel strength in terms of the composition's physical resistance to elastic deformation. The viscous modulus (G") describes the hydrogel strength in terms of the composition's physical resistance to viscous deformation.

In typical hydrogel characterization experiments, oscillatory frequency sweeps are conducted at 25° C. after a 2-minute sample equilibration time, at a constant 1% strain (γ), over a frequency range of 0.1-100 rad/s with a logarithmic increase in frequency. Oscillatory strain sweeps are conducted at 25° C. after a 2-minute sample equilibration time, at a constant 10 rad/s frequency, over a range of 0.1% to 1000% strain with a logarithmic increase in strain.

Figure 5:
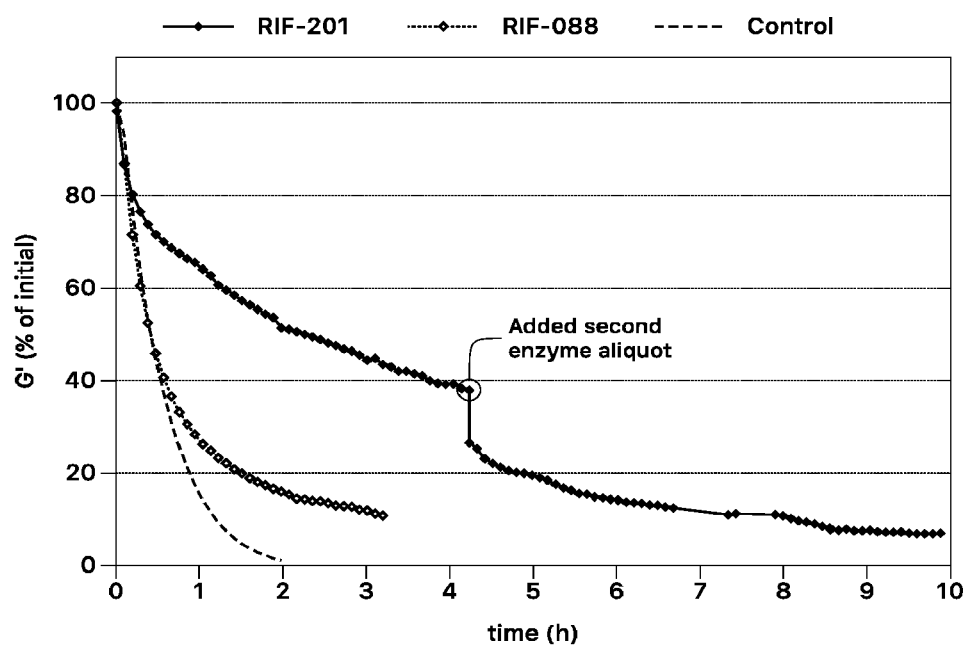
FIG. 5 shows representative in vitro enzymatic degradation of two example formulations (RIF-201 and RIF-088), compared to a commercially available BDDE-crosslinked hyaluronic acid hydrogel (Control), demonstrating the tunable stability to enzymatic degradation of some embodiments of the invention. In many embodiments of the invention, the compositions show increased stability to enzymatic degradation than HA-BDDE compositions, while remaining fully enzymatically degradable.
Figure 6:
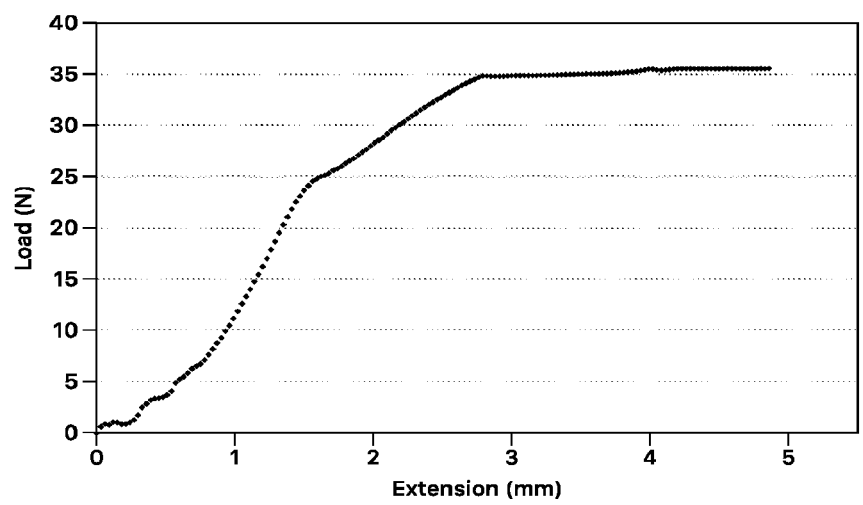
FIG. 6 shows representative injection force or needle extrusion force characteristics, as measured with an Instron tensile/compressive force testing apparatus.
Figure 7:
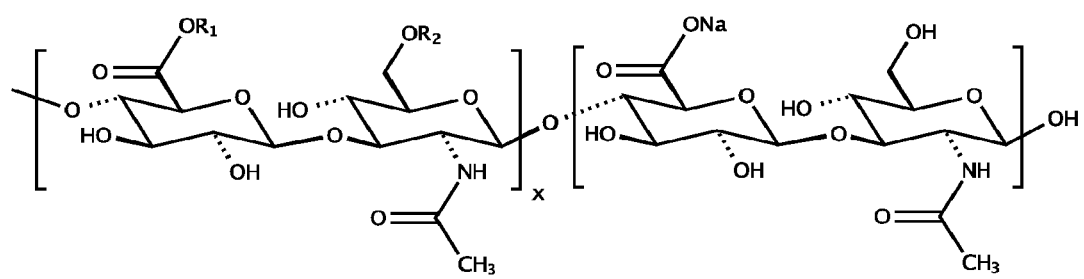
FIG. 7 shows representative molecular structures important to some embodiments of the invention, specifically a representative structure of hyaluronic acid modified with various groups used in further crosslinking reactions, which is one example of the polysaccharide component of the invention. In the example structure shown, there are x disaccharide units of modified HA and y units of unmodified HA in a given polysaccharide chain of x+y total disaccharide units in length.
Figure 7:
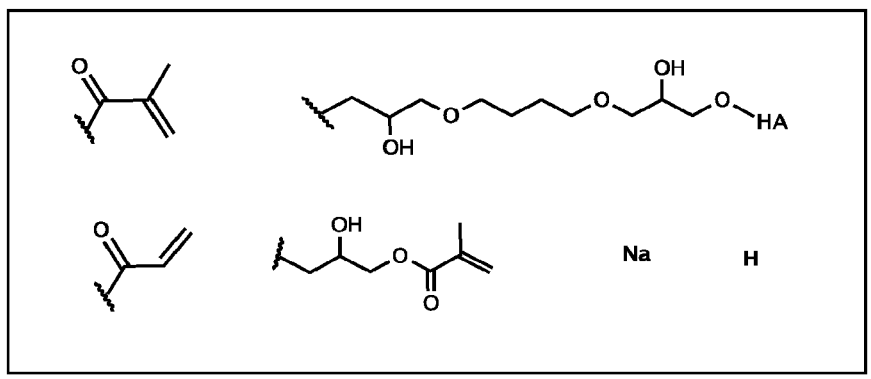

Rheological tracking of the enzymatic or proteolytic degradation of some compositions is also performed. In these experiments, 50 μL of a 25 mg/mL enzyme solution (i.e., hyaluronidase) in appropriate buffer is added to 1000 μL of a hydrogel composition and gently mechanically mixed for 10 seconds to disperse the enzyme throughout the composition. The composition is then transferred to the rheometer, and five instances of G' and G" are measured (1% strain, 10 rad/s) over 30 s, followed by a 5-minute resting period. This sequence is repeated until $G'<(0.1)* G'_{initial}$. Complete degradation typically requires between 2 and 10 h under these conditions. Data obtained from representative experiments are shown in FIG. 5.

Example 3—Extrusion Tests of the Compositions

To determine the force required to extrude the gels through syringe and needle combinations typical of products similar to some embodiments of the composition, they are loaded into 1 mL BD Hylok glass syringes attached to ½" 30 G TSK or Terumo Luer-lock needles. Then, using an Instron 5543A mechanical testing instrument, the syringe plunger is pushed at a rate of 100 mm/min for about 10 mm or until a clear force plateau is reached. The profile of applied force per plunger position is recorded. In typical formulations, an average extrusion force of 25-40 N was seen from 4 through 10 mm.
Examples of Synthesis and Processing Methods Example 4—Method of Making Glycidyl Methacrylate Modified Hyaluronic Acid Sodium hyaluronate (HA) is modified or functionalized with methacrylate groups in some embodiments of the composition to make methacrylated HA (MeHA), to facilitate a later crosslinking reaction with the polyzwitterionic component (monomer or polymer). In an example methacrylation reaction, 500 mg of HA is dissolved in 50 mL of pure water, and 1.8 grams of tetrabutyl ammonium bromide (TBAB), 1.8 mL of triethylamine (TEA), and 1.8 mL of glycidyl methacrylate are added and stirred to combine. Under magnetic stirring, the reaction is allowed to proceed to 18 hours at 25° C., followed by 1 hour at 60° C. The product is precipitated in acetone three times, and then dialyzed against sterile phosphate-buffered saline (PBS) or other aqueous buffer for 2 days, with twice-daily dialysis buffer changes. The purified MeHA product is then lyophilized at −54° C. and 0.04 Torr.

Example 5—Method of Making an Injectable Composition (One Pot)

In an example composition, a pre-reaction solution of methacrylated sodium hyaluronate (MeHA) and carboxybetaine acrylamide (CBAA) monomer is produced by dissolving 1 MDa MeHA (10 mg/mL), CBAA (20 mg/mL), and photoinitiator 2-hydroxy-1-[4-(2-hydroxyethoxy)phenyl]-2-methyl-1-propanone (I2959, 0.5 mg/mL) in a 0.9 wt % (150 mM) buffered saline solution at pH 7.4. This pre-reaction solution is allowed to equilibrate in the dark for up to 60 mins until homogeneously combined.

The pre-reaction solution is then cast, e.g., into a 1-mm thick borosilicate glass mold with medical-grade PDMS gasket, and polymerized in a UVP CL-1000M crosslinking oven (15 mins, 1 J/cm$^2$, 302 nm). The resulting hydrogel is removed from the mold and placed in sterile phosphate buffered saline (150 mM) for 2-5 days to remove any unreacted components and allow swelling. Equilibrated gels are then transferred into an extrusion apparatus consisting of a tightly-fit piston and cylinder capped with a section of steel mesh, and particulated via extrusion through the mesh. This mesh extrusion or gel particulation process is typically repeated using meshes of decreasing pore size; e.g., 250 μm, 120 μm, and then 60 μm. At the final mesh size used, the composition is extruded at least three times to improve particulated gel size homogeneity. The particulated gels are precipitated in 70% ethanol/30% water, and then either (1) dried under vacuum or (2) rehydrated with water or buffer and lyophilized at −54° C. and 0.04 Torr. The dried particulated gels are then rehydrated with sterile water for injection (WFI) to the desired polymer concentration and dispensed into syringes under aseptic conditions. Final compositions are characterized by rheological analysis as described above and syringe force extrusion tests.

TABLE 1 below shows data related to the synthesis and characterization of example formulations made in this fashion. In this example, the concentration of each component in the pre-reaction solution was held constant, and the total polymer concentration in the final composition was varied between 33 mg/mL and 100 mg/mL. Rheological data measured for each sample are shown.

TABLE 1

| SAMPLE | [REACTION] (MG/ML) | | [POLYMER] (MG/ML) | G' (PA) | G" (PA) | XSTRAIN (%) |
|---|---|---|---|---|---|---|
| | [CBAA] | [MeHA] | | | | |
| A-33 | 20 | 10 | 33 | 290 | 52 | 90 |
| A-50 | 20 | 10 | 50 | 1400 | 136 | 357 |
| A-100 | 20 | 10 | 100 | 1773 | 166 | 537 |

Example 6—Method of Making Dual-Crosslinked (BDDE and Polyzwitterionic) Hyaluronic Acid Compositions In some embodiments, sodium hyaluronate (HA) or methacrylated HA (MeHA) is crosslinked with 1,4-butanediol-diglycidyl ether (BDDE) or other diepoxide compounds before, during, or after crosslinking or reaction with the polyzwitterionic component in some embodiments. To make BDDE-crosslinked HA or MeHA, 1 g HA or MeHA is dissolved in 7 g 0.25M NaOH until fully dissolved. Then, 50 mg BDDE in a solution of 0.2 g of 0.25 M NaOH is added, and the reaction is allowed to proceed under stirring for 2 h at 50° C. During the last 1 h of this reaction, zwitterionic monomer (e.g., CBAA) and photo-initiator (e.g., 2-hydroxy-1-[4-(2-hydroxyethoxy)phenyl]-2-methyl-1-propanone (I2959, 0.5 mg/mL) are added to the reaction mixture to the desired concentration. When the BDDE crosslinking reaction is complete, the crosslinked material containing zwitterionic monomer and photoinitiator is transferred to a glass casting mold or other vessel and exposed to UV radiation in a crosslinking oven (15 mins, 1 J/cm$^2$, 302 nm). The dual-crosslinked material is passed through mesh for particulation and precipitated in an organic solvent or lyophilized.

Example 7—Method of Lyophilizing Compositions and Intermediate Products

Lyophilization or freeze-drying of the compositions is a practical means to store, transport, and return them to the desired level of hydration. While it is important to note that lyophilizing polysaccharide-based formulations may result in molecular weight reduction or structural damage under some conditions, the polyzwitterionic component of some embodiments of the composition may confer some protection during this process. This effect may also be enhanced by the particularly strong hydration of zwitterionic materials. A formulation of the composition is determined to be "lyophilization stable" if it retains one or preferably all of the following characteristics: transparency, homogeneity, hydration potential, and heological attributes.

While illustrative embodiments have been illustrated and described, it will be appreciated that various changes can be made therein without departing from the spirit and scope of the invention.

Unless otherwise indicated, all numbers expressing quantities of ingredients, properties such as molecular weight, reaction conditions, and so forth used in the specification and claims are to be understood as being modified in all instances by the term "about." As used herein, the term "about" refers to ±5% of the specified value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the," and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

What is claimed is:

1. A hydrogel composition, or a dehydrated composition capable of forming a hydrogel upon hydration, comprising a plurality of polyzwitterionic components (Z*) and polysaccharide components (C*), wherein:
   Z* comprises an acrylic or methacrylic backbone having zwitterionic pendant groups;
   the polyzwitterionic and polysaccharide components are covalently linked;
   one or more of the polysaccharide components (C*) are covalently crosslinked with another polysaccharide component (C*) by acrylate, methacrylate, acrylamide, or methacrylamide modification of the polysaccharide component and subsequent free-radical reaction.

2. The hydrogel composition or dehydrated composition of claim 1, wherein the polyzwitterionic component comprises an acrylic or methacrylic backbone poly(carboxybetaine), poly(phosphorylcholine), poly(sulfobetaine), poly(phosphobetaine), or poly(ectoine), copolymers thereof, or pharmaceutically acceptable salts thereof, formed by polymerization of zwitterionic acryloyl or methacryloyl monomers.

3. The hydrogel composition or dehydrated composition of claim 1, wherein the polyzwitterionic component acrylic or methacrylic backbone poly(carboxybetaine), copolymers thereof, or pharmaceutically acceptable salts thereof, formed by polymerization of zwitterionic acryloyl or methacryloyl monomers.

4. The hydrogel composition or dehydrated composition of claim 1, wherein the polysaccharide component is selected from the group consisting of agar, alginates, carrageenan gum, cellulose, chitosan, chitin, cyclodextrin, dextran, gellan gum, glycogen, glycosaminoglycan, gum karaya, inulin, pectin, polydextrose, and xanthan gum, or pharmaceutically acceptable salts thereof,
   wherein, in addition to acrylate, methacrylate, acrylamide, or methacrylamide modification, the polysaccharide component has been optionally functionalized, dextrinized, oxidized, alkylated, hydroxyalkylated, acetylated, fractionated, or physically modified.

5. The hydrogel composition or dehydrated composition of claim 1, wherein the polysaccharide component comprises a glycosaminoglycan.

6. The hydrogel composition or dehydrated composition of claim 1, wherein the polysaccharide component comprises hyaluronic acid (HA) or a pharmaceutically acceptable hyaluronate salt thereof.

7. The hydrogel composition or dehydrated composition of claim 1, wherein the hydrogel composition or dehydrated composition contains a weight ratio of polyzwitterionic component to polysaccharide-based component of about 0.001 to about 1000.

8. The hydrogel composition or dehydrated composition of claim 1, wherein the hydrogel composition or dehydrated composition contains a weight ratio of polyzwitterionic component to polysaccharide-based component of about 0.03 to about 100.

9. The hydrogel composition or dehydrated composition of claim 1, wherein the hydrogel composition or dehydrated composition contains a weight ratio of polyzwitterionic component to polysaccharide-based component of about 0.1 to about 10.

10. The hydrogel composition of claim 1, wherein the hydrogel composition has a total polymer concentration between about 10 mg/mL to 300 mg/mL.

11. The hydrogel composition of claim 1, wherein the hydrogel composition has a total polymer concentration between about 10 mg/mL to 100 mg/mL.

12. The hydrogel composition or dehydrated composition of claim 1, further comprising one or more additional agents, additives, drugs, biomolecules or cells, that provide therapeutic, preservative, material, or cosmetic utility.

13. The hydrogel composition or dehydrated composition of claim 1, further comprising one or more additives of cosmetic or therapeutic utility.

14. The hydrogel composition or dehydrated composition of claim 1, wherein the hydrogel composition or dehydrated composition further comprises at least one polysaccharide component that is not crosslinked and is not bound to a polyzwitterionic component, wherein the at least one polysaccharide component modulates viscosity or promotes local anesthetic delivery.

15. The hydrogel composition of claim 1, further comprising an injectable material, suitable for augmenting or replacing lost or damaged tissue, or for providing a cosmetic or regenerative function.

16. The hydrogel composition or dehydrated composition of claim 1, further comprising a material or additive suitable for cell preservation, suitable for cell storage, suitable for an injectable cell therapy formulation or suitable for a tissue culture scaffold.

17. The hydrogel composition or dehydrated composition of claim 1, further comprising drugs or biomolecules, and upon injection, wherein the hydrogel composition forms a drug depot or a protective or stabilizing environment for programmed release of said drugs or biomolecules.

18. The hydrogel composition of claim 1, wherein the hydrogel composition comprises both hydrogel particles and a continuous hydrogel or polymeric phase.

19. The hydrogel composition or dehydrated composition of claim 1, further comprising cells selected from the group consisting of exocrine secretory epithelial cells, hormone secreting cells, keratinizing epithelial cells, wet stratified barrier epithelial cells, sensory transducer cells, autonomic neuron cells, sense organ and peripheral neuron supporting cells, neurons and glial cells, lens cells, hepatocytes, adipocytes, lipocytes, barrier function cells, kidney cells, heart cells, extracellular matrix cells, contractile cells, blood cells, and immune system cells.

20. The hydrogel composition of claim 1, wherein the hydrogel composition has been reconstituted with an aqueous solvent, buffer, or media formulation.

21. The hydrogel composition of claim 1, wherein the hydrogel composition is a dermal filler.

22. The hydrogel composition of claim 1, wherein the hydrogel composition is a steam-sterilized dermal filler formulated for parenteral administration.

23. The hydrogel composition or dehydrated composition of claim 1, wherein the Z* component comprises a poly(carboxybetaine), and the C* component comprises hyaluronic acid or hyaluronate salt.

24. The hydrogel composition or dehydrated composition of claim 13, wherein the one or more additives are selected from the group consisting of local anesthetic, peptide, nucleic acid, protein, nanoparticle, microparticle, micelle, liposome, polymersome, drug, and drug precursor.

25. A method of delivering a drug or an additive of therapeutic or cosmetic utility to a subject, the method comprising:

introduction to a subject a formulation comprising the hydrogel composition of claim 1 further comprising the drug or additive of therapeutic or cosmetic utility.

26. The method of claim 25, wherein the introduction of the formulation to the subject occurs by injection.

27. A method of storing, preserving, or transporting cells, tissues, or organs, the method comprising associating or combining the hydrogel composition or dehydrated composition of claim 1 with cells, tissues, or organs.

28. A method of surgically repairing, protecting, preserving, or protecting a tissue, organ, or part of a human body, the method comprising applying the hydrogel composition or dehydrated composition of claim 1 to the tissue, organ, or part of the human body as part of a surgical procedure.

29. A method of forming a composition, the method comprising:
   A) providing at least one polysaccharide comprising acrylate, methacrylate, acrylamide, or methacrylamide groups reactive in a radical-mediated polymerization reaction;
   B) providing a zwitterionic monomer having acryloyl or methacryloyl groups;
   C) combining the at least one polysaccharide comprising acrylate, methacrylate, acrylamide, or methacrylamide, groups reactive in a radical-mediated polymerization reaction with the zwitterionic monomer together, optionally in combination with free-radical initiation molecules, which are optionally photoinitiators;
   D) polymerizing the mixture of the at least one polysaccharide comprising acrylate, methacrylate, acrylamide, or methacrylamide containing groups reactive in a radical-mediated polymerization reaction and the zwitterionic monomer via a photo-initiated, free-radical mediated polymerization reaction; and
   E) optionally combining with water or an aqueous solution to form a hydrogel.

30. The method of claim 29, wherein the polysaccharide comprising acrylate, methacrylate, acrylamide, or methacrylamide groups reactive in a radical-mediated polymerization reaction was made by:
   A) providing a polysaccharide selected from the group consisting of agar, alginates, carrageenan gum, cellulose, chitosan, chitin, cyclodextrin, dextran, gellan gum, glycogen, glycosaminoglycan, gum karaya, inulin, pectin, polydextrose, and xanthan gum, or pharmaceutically acceptable salts thereof; and
   B) derivatizing said polysaccharide with acrylate, methacrylate, acrylamide, or methacrylamide groups reactive in a radical-mediated polymerization.

31. The method of claim 29, wherein the zwitterionic monomer is carboxybetaine acrylamide.

\* \* \* \* \*